(12) United States Patent
Roy et al.

(10) Patent No.: US 12,549,631 B2
(45) Date of Patent: Feb. 10, 2026

(54) NETWORK ATTACHED STORAGE (NAS) SERVER MIGRATION ACROSS STORAGE ARRAYS

(71) Applicant: Dell Products L.P., Round Rock, TX (US)

(72) Inventors: Pankaj Kumar Roy, Bangalore (IN); Mithun Mahendra Varma, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 18/680,453

(22) Filed: May 31, 2024

(65) Prior Publication Data

US 2025/0373691 A1    Dec. 4, 2025

(51) Int. Cl.
*H04L 67/1097* (2022.01)
*H04L 41/084* (2022.01)

(52) U.S. Cl.
CPC ...... *H04L 67/1097* (2013.01); *H04L 41/0846* (2013.01)

(58) Field of Classification Search
CPC .......................... H04L 67/1097; H04L 41/0846
See application file for complete search history.

(56) References Cited

U.S. PATENT DOCUMENTS

| | | | |
|---|---|---|---|
| 8,370,592 B1 * | 2/2013 | Specht | G06F 11/3055 707/661 |
| 8,392,370 B1 | 3/2013 | Whitney et al. | |
| 9,449,007 B1 | 9/2016 | Wood et al. | |
| 9,727,588 B1 | 8/2017 | Ostapovicz et al. | |
| 10,498,821 B1 * | 12/2019 | Bono | H04L 67/1095 |
| 12,135,618 B2 | 11/2024 | Mitkar et al. | |
| 12,164,469 B2 | 12/2024 | Shilane et al. | |
| 2004/0133573 A1 | 7/2004 | Miloushev et al. | |
| 2004/0133577 A1 | 7/2004 | Miloushev et al. | |
| 2004/0133606 A1 | 7/2004 | Miloushev et al. | |
| 2004/0133607 A1 | 7/2004 | Miloushev et al. | |
| 2004/0133650 A1 | 7/2004 | Miloushev et al. | |
| 2004/0133652 A1 | 7/2004 | Miloushev et al. | |
| 2009/0077097 A1 | 3/2009 | Lacapra et al. | |
| 2009/0106255 A1 | 4/2009 | Lacapra et al. | |
| 2010/0114889 A1 * | 5/2010 | Rabii | G06F 16/1824 707/E17.032 |
| 2011/0022812 A1 | 1/2011 | Van Der Linden et al. | |

(Continued)

*Primary Examiner* — Caroline H Jahnige
(74) *Attorney, Agent, or Firm* — BainwoodHuang

(57) ABSTRACT

Techniques are directed to performing NAS server migration (e.g., between arrays or appliances). Such a technique involves, after a NAS server has accessed source volumes on a source array through a tunnel endpoint on the source array, configuring the NAS server to access the source volumes through source devices of the source array in place of the tunnel endpoint on the source array. Such a technique further involves, after the NAS server is configured to access the source volumes through the source devices of the source array, moving the NAS server from the source array to a destination array. Such a technique further involves, after the NAS server is moved from the source array to the destination array, configuring the NAS server to access destination volumes on the destination array in place of the source volumes on the source array.

17 Claims, 11 Drawing Sheets

(56) References Cited

U.S. PATENT DOCUMENTS

| | | | |
|---|---|---|---|
| 2013/0318210 A1* | 11/2013 | Lent | G06F 3/0647 |
| | | | 709/219 |
| 2023/0007483 A1 | 1/2023 | Mueck et al. | |
| 2024/0354025 A1 | 10/2024 | Zhang et al. | |
| 2024/0361941 A1 | 10/2024 | Konnur et al. | |

* cited by examiner

NETWORK ATTACHED STORAGE (NAS) SERVER MIGRATION ACROSS STORAGE ARRAYS

BACKGROUND

Conventional storage appliances include storage processors and storage devices. The storage processors serve as execution platforms enabling network attached storage (NAS) servers running on the storage processors to store data into and load data from volumes on the storage devices on behalf of NAS clients.

During operation, the NAS servers may access the volumes through tunnel endpoints which are layers of abstraction that enable the volumes to be locally visible to the NAS servers. The use of such tunnel endpoints alleviates the need to directly mount the volumes as devices on the storage appliance platforms. Volumes which are accessed through tunnel endpoints may be referred to as tunnel volumes.

SUMMARY

It should be understood that there are deficiencies to the above-described approach to accessing tunnel volumes through tunnel endpoints. Along these lines, for network attached storage (NAS) servers to have paths to access the tunnel volumes, mappings must be generated. Unfortunately, if one wished to migrate a NAS server from one appliance to another, generation of such mappings may require a relatively long amount of time (e.g., several minutes) and, during such time, the tunnel volumes would not yet be accessible.

For example, suppose that a NAS server accesses several tunnel volumes on a first appliance through a first tunnel endpoint on the first appliance. Further suppose that migration of the NAS server from the first appliance to a second appliance involves copying the tunnel volumes from the first appliance to the second appliance, stopping the NAS server on the first appliance, starting the NAS server on the second appliance, and then operating the NAS server on the second appliance with access to the tunnel volumes on the second appliance through a second tunnel endpoint on the second appliance.

In this situation, after the NAS server is started on the second appliance, it may take several minutes to establish all of the paths/mappings/etc. on the second appliance to enable the NAS server to access the tunnel volumes through the second tunnel endpoint on the second appliance. Unfortunately, during this time, NAS clients are unable to access the tunnel volumes on the second appliance even after the NAS server is started on the second appliance (and the first tunnel endpoint on the first appliance cannot make the tunnel volumes on the first appliance visible to the second appliance). Such delay may result in prolonged data unavailability (DU) or even data loss (DL), NAS client anomalies/errors (e.g., timeouts, runtime abnormalities, application crashes, etc.), and so on.

In contrast to the above-described approach to migrating a NAS server from a first appliance to a second appliance which involves waiting for the paths/mappings/etc. to be established on the second appliance, improved techniques are directed to performing NAS server migration across storage arrays by converting tunnel volumes on a source array into normal volumes (e.g., volumes that are directly mounted as devices of the source array). Following such conversion, the NAS server may be moved from the source array to a destination array, and then quickly acquire access to the normal volumes on the source array. While the NAS server is on the destination array and has access to the normal volumes on the source array, the normal volumes may be mirrored to corresponding normal volumes on the destination array. The NAS server may then be quickly switched to accessing the corresponding normal volumes on the destination array in place of accessing the normal volumes on the source array. The corresponding normal volumes on the destination array may then be converted to tunnel volumes which are locally visible on the destination array through a tunnel endpoint on the destination array (e.g., via mapping generation). Such converting/mirroring/mapping/etc. may be transparent to NAS clients and not impose any extensive time delays that would otherwise cause DU/DL, other NAS client issues, etc.

One embodiment is directed to a method of performing NAS server migration. The method includes, after a NAS server has accessed source volumes on a source array through a tunnel endpoint on the source array, configuring the NAS server to access the source volumes through source devices (or simply devices) of the source array in place of the tunnel endpoint on the source array. The method further includes, after the NAS server is configured to access the source volumes through the source devices of the source array, moving the NAS server from the source array to a destination array. The method further includes, after the NAS server is moved from the source array to the destination array, configuring the NAS server to access destination volumes on the destination array in place of the source volumes on the source array.

Another embodiment is directed to electronic equipment which includes memory and control circuitry coupled with the memory. The memory stores instructions which, when carried out by the control circuitry, cause the control circuitry to perform a method of:

(A) after a NAS server has accessed source volumes on a source array through a tunnel endpoint on the source array, configuring the NAS server to access the source volumes through source devices of the source array in place of the tunnel endpoint on the source array, (B) after the NAS server is configured to access the source volumes through the source devices of the source array, moving the NAS server from the source array to a destination array (e.g., while still accessing source volumes), and (C) after the NAS server is moved from the source array to the destination array, configuring the NAS server to access destination volumes on the destination array in place of the source volumes on the source array.

Yet another embodiment is directed to a computer program product having a non-transitory computer readable medium which stores a set of instructions to perform network attached storage (NAS) server migration. The set of instructions, when carried out by computerized circuitry, causes the computerized circuitry to perform a method of:

(A) after a NAS server has accessed source volumes on a source array through a tunnel endpoint on the source array, configuring the NAS server to access the source volumes through source devices of the source array in place of the tunnel endpoint on the source array;

(B) after the NAS server is configured to access the source volumes through the source devices of the source array, moving the NAS server from the source array to a destination array; and (C) after the NAS server is moved from the source array to the destination array, configuring the NAS server to access destination volumes on the destination array in place of the source volumes on the source array.

In some arrangements, the method further includes, prior to configuring the NAS server to access the source volumes through source devices of the source array, operating the NAS server on the source array to provide input/output (I/O) access to the source volumes in response to I/O requests from a set of NAS clients.

In some arrangements, operating the NAS server on the source array includes, in response to the I/O requests from the set of NAS clients, performing read and write operations on the source volumes through the tunnel endpoint on the source array.

In some arrangements, configuring the NAS server to access the source volumes through the source devices of the source array includes mounting the source volumes on the source array directly as the source devices of the source array.

In some arrangements, configuring the NAS server to access the source volumes through the source devices of the source array further includes, after the source volumes on the source array are directly mounted as the source devices of the source array, disabling use of the tunnel endpoint on the source array.

In some arrangements, the method further includes, prior to moving the NAS server from the source array to the destination array, establishing mirroring relationships between the source volumes on the source array and the destination volumes on the destination array.

In some arrangements, establishing the mirroring relationships includes, while the NAS server provides I/O access to the source volumes in response to I/O requests from a set of NAS clients, copying data from the source volumes on the source array to the destination volumes on the destination array.

In some arrangements, moving the NAS server from the source array to the destination array includes:
 (i) copying NAS server configuration information from the source array to the destination array, and
 (ii) based on the NAS server configuration information copied from the source array to the destination array, creating a NAS server compute instance on the destination array.

In some arrangements, moving the NAS server from the source array to the destination array further includes terminating operation of a NAS server compute instance on the source array.

In some arrangements, the method further includes, after the NAS server is moved from the source array to the destination array and prior to configuring the NAS server to access the destination volumes on the destination array, configuring the NAS server to access the source volumes on the source array from the destination array.

In some arrangements, configuring the NAS server to access the source volumes on the source array from the destination array includes, while data is being copied from the source volumes on the source array to the destination volumes on the destination array, establishing device paths which enable the NAS server to access the source volumes on the source array through destination devices of the destination array.

In some arrangements, configuring the NAS server to access the destination volumes on the destination array includes configuring the NAS server to access the destination volumes through destination devices of the destination array in place of accessing the source volumes on the source array.

In some arrangements, configuring the NAS server to access the destination volumes on the destination array further includes, after the NAS server is configured to access the destination volumes through the destination devices of the destination array, configuring the NAS server to access the destination volumes through a tunnel endpoint of the destination array in place of the destination devices of the destination array.

In some arrangements, the source volumes on the source array include source data volumes and source metadata volumes. Additionally, the destination volumes on the destination array include destination data volumes corresponding to the source data volumes and destination metadata volumes corresponding to the source metadata volumes. Furthermore, the method further includes, after the NAS server is configured to access the destination volumes on the destination array and in response to input/output (I/O) requests from a set of NAS clients, accessing the destination data volumes and the destination metadata volumes.

In some arrangements, the method further includes, after the NAS server is configured to access the destination volumes on the destination array, deleting the source data volumes and the source metadata volumes.

It should be understood that, in the cloud context, at least some electronic circuitry (e.g., hosts) may be formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, appliances, assemblies, computer program products, and so on. Some embodiments are directed to various methods, electronic components and circuitry which are involved in migrating a NAS server from one storage platform to another.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing network attached storage (NAS) server migration across storage arrays by converting (or preconverting) tunnel volumes on a source array into normal volumes (e.g., volumes that are directly mounted as devices of the source array). Following such conversion, the NAS server is moved from the source array to a destination array, and then quickly acquires access to the normal volumes on the source array. While the NAS server is on the destination array and has access to the normal volumes on the source array, the normal volumes are mirrored to corresponding normal volumes on the destination array. The NAS server is then quickly switched to accessing the corresponding normal volumes on the destination array in place of accessing the normal volumes on the source array. The corresponding normal volumes on the destination array are then converted to tunnel volumes which are locally visible on the destination array through a tunnel endpoint on the destination array (e.g., via mapping generation). Such converting/mirroring/mapping/etc. may be transparent to NAS clients (e.g., performed in the background without urgency and/or without interfering with NAS client access to the volumes) and not impose any extensive time delays that would otherwise cause DU/DL, other NAS client issues, etc.

Figure 1:
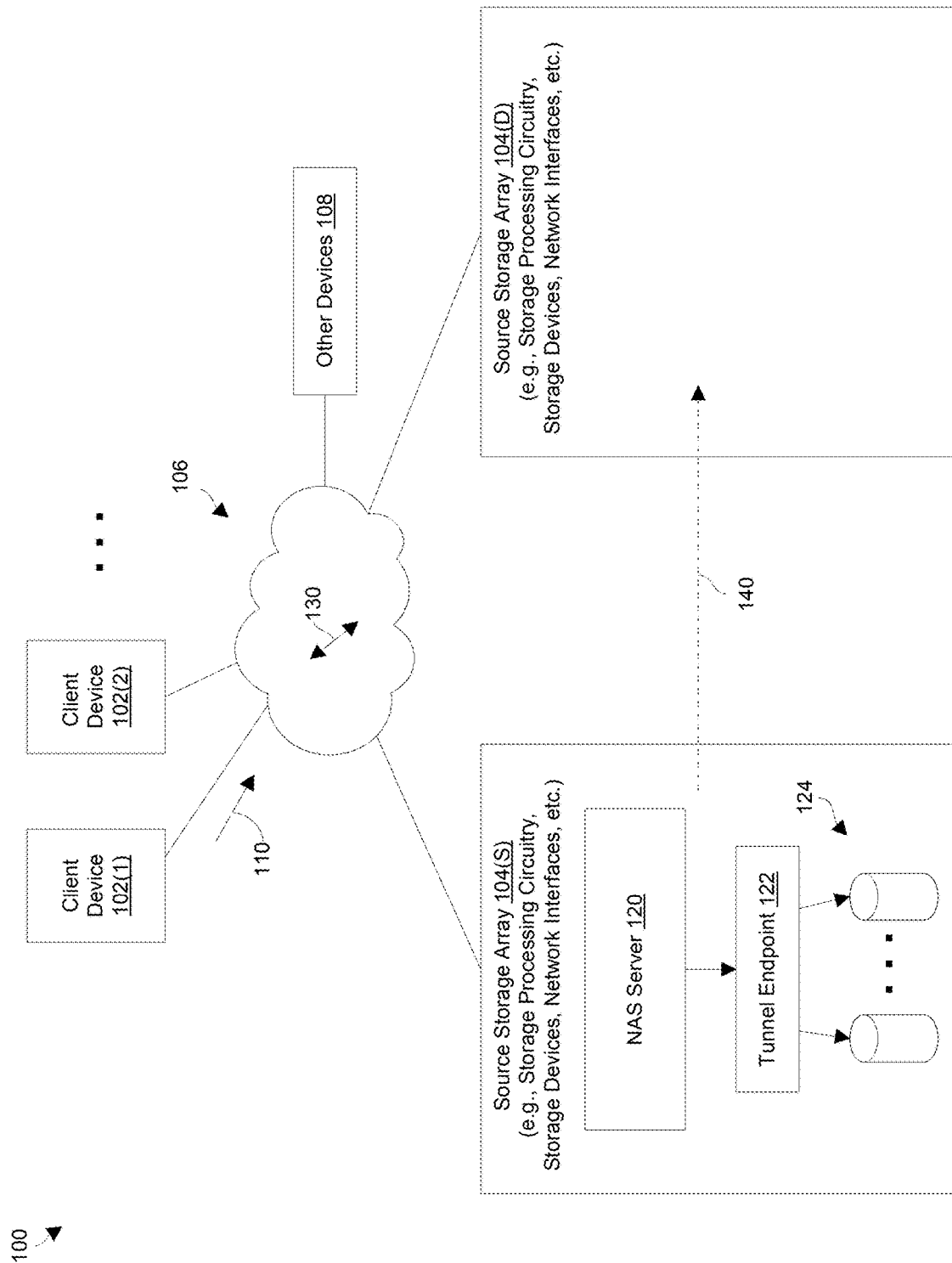
FIG. 1 is a block diagram of an electronic setting within which network attached storage (NAS) server migration is performed in accordance with certain embodiments.

FIG. 1 shows an electronic setting 100 within which NAS server migration is performed in accordance with certain embodiments. The electronic setting 100 includes client devices 102(1), 102(2), . . . (collectively, client devices 102), storage arrays 104(S), 104(D) (collectively, arrays 104), a communications medium 106, and optionally one or more other devices 108.

The client devices 102 are constructed and arranged to perform useful work. Along these lines, the client devices 102 may run NAS clients which communicate with NAS servers on the storage arrays 104 to store and retrieve data. For example, one or more of the client devices 102 may operate as a file server, a web server, an email server, an enterprise server, a database server, a transaction server, combinations thereof, etc. which provides input/output (I/O) requests 110 to one or more of the storage arrays 104. In this situation, the client devices 102 may utilize a variety of different I/O requests 110 (e.g., block and/or file based write commands, block and/or file based read commands, combinations thereof, etc.) that direct the storage arrays 104 to store data within and retrieve data from storage (e.g., primary storage or main memory, secondary storage, tiered storage, combinations thereof, etc.).

The storage arrays 104 are constructed and arranged to be routinely accessed by the client devices 102. Along these lines, the storage arrays 104 may include storage processing circuitry (e.g., storage processors or SPs) and storage devices (e.g., solid state devices (SSDs), hard disk drives (HDDs), combinations thereof, etc.). The storage arrays 104 may take a variety of form factors including cabinet style equipment, rack mounted enclosures, appliances, disk array enclosure (DAE) assemblies, and so on. Additionally, other types of electronic equipment are suitable for use as the storage arrays 104 as well such as general purpose computing equipment, database equipment, computational equipment, network equipment, specialize equipment, combinations thereof, etc.

The storage arrays 104 serve as platforms on which NAS servers 120 are able to operate. Such NAS servers 120 have their own respective sets of Internet Protocol (IP) addresses. Accordingly, NAS clients are able to easily communicate with the NAS servers 120 in accordance with various standards such as network file system (NFS)/server message block (SMB) protocols, etc.

For example, as shown in FIG. 1, the storage array 104(S) currently runs a NAS server 120 to service I/O requests 110 from one or more NAS clients. The storage array 104(S) further has a tunnel endpoint 122 and volumes 124.

Such a tunnel endpoint 122 is layer of abstraction that enables the volumes 124 to be locally visible to the NAS server 120. Along these lines, the tunnel endpoint 122 includes paths, mappings, etc. that alleviate the need to directly mount the volumes 124 as devices (e.g., operating system resources which may be limited in number) of the storage array 104(S). Accordingly, the NAS server 120 is able to access the volumes 124 through the tunnel endpoint 122.

It should be understood that the arrays 104 may support concurrent operation of multiple NAS servers 120. Additionally, it may be desirable to migrate multiple NAS servers 120 from one array 104 to another array 104 (e.g., one-by-one).

The communications medium 106 is constructed and arranged to connect the various components of the electronic setting 100 together to enable these components to exchange electronic signals 130 (e.g., see the double arrow 130) and thus communicate with each other. The communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, combinations thereof, etc.

The other devices 108 are optional and may communicate with various componentry within the electronic setting 100. Along these lines, the other devices 108 may include a set of user devices that communicate with NAS clients running on the client devices 102. Additionally, the other devices 108 may include other storage equipment (e.g., one or more replication sites for failover, backup/archiving equipment, etc.). Furthermore, the other devices 108 may include specialized tools and/or applications to manage/control/configure the storage arrays 104 (e.g., service processors, software repositories, special tools, etc. to upgrade, repair, reconfigure, or otherwise service the storage arrays 104).

During operation, the storage arrays 104 process I/O requests 110 from the client devices 102 to accomplish useful work. For example, the NAS server 120 of the storage array 104(S) may store data within and retrieve data from the volumes 124 via the tunnel endpoint 122 in response to read and write commands from NAS clients. Accordingly, the volumes 124 may include various volumes for storing host data, snapshots, backups, metadata, and so on to enable the NAS server 120 to provide storage services in a rich and reliable manner.

It should be understood that the storage array 104(D) may operate in a manner similar to that of the storage array 104(S). Along these lines, the storage array 104(D) is constructed and arranged to serve as a platform for running NAS servers which respond to storage commands from NAS clients.

At some point, a decision may be made to migrate the NAS server 120 from the storage array 104(S) to the storage array 104(D) (illustrated by the dashed arrow 140 in FIG. 1). In such a situation, the storage array 104(S) is considered to be a source array and the storage array 104(D) is considered to be a destination array. Along these lines, migration may be for a variety of reasons such as load balancing (e.g., moving workload from one array 104 to another array 104), upgrading (e.g., running the NAS server 120 on newer equipment), optimizing (e.g., taking advantage of certain attributes/features via moving the NAS server 120), combinations thereof, etc.

Such NAS server migration may be managed (or orchestrated) by specialized circuitry within the electronic setting 100. Such specialized circuitry may reside within one or more of the arrays 104 and/or be external to the arrays 104 (e.g., within a client device 102, within one of the other devices 108, etc.).

In particular, the specialized circuitry converts (or preconverts) the volumes 124 on the source array 104(S), which are currently tunnel volumes because they are accessed through the tunnel endpoint 122, into normal volumes (e.g., volumes that are directly mounted as visible devices). Following such conversion, the specialized circuitry moves the NAS server 120 from the source array 104(S) to the destination array 104(D) where, after the NAS server 120 starts on the destination array 104(D), the NAS server 120 is able to quickly acquire access to the normal volumes on the source array 104(S). While the NAS server 120 is on the destination array and has access to the normal volumes on the source array 104(S), the specialized circuitry oversees mirroring of the normal volumes on the source array 104(S) to corresponding normal volumes on the destination array 104(D) (e.g., the specialized circuitry establishes mirroring relationships to copy data from the volumes on the source array 104(S) to corresponding volumes on the destination array 104(D)). After the data is fully mirrored, the specialized circuitry quickly switches the NAS server 120 to accessing the corresponding normal volumes on the destination array 104(D) in place of accessing the normal volumes on the source array 104(S). The specialized circuitry then converts the corresponding normal volumes on the destination array 104(D) to tunnel volumes which are locally visible on the destination array 104(D) through a tunnel endpoint on the destination array 104(D) (e.g., via mapping generation).

During such NAS server migration, converting/mirroring/mapping/etc. may be transparent to NAS clients (e.g., performed in the background without urgency and/or without interfering with NAS client access to the volumes). Accordingly, such NAS server migration does not impose any extensive time delays that would otherwise cause DU/DL, other NAS client issues, etc.

Moreover, if multiple NAS servers 120 resided on the source array 104(S) and are to be migrated to the destination array 104(D), another NAS server migration process may be initiated upon completion of the earlier NAS server migration process. Further details will now be provided with reference to FIG. 2.

Figure 2:
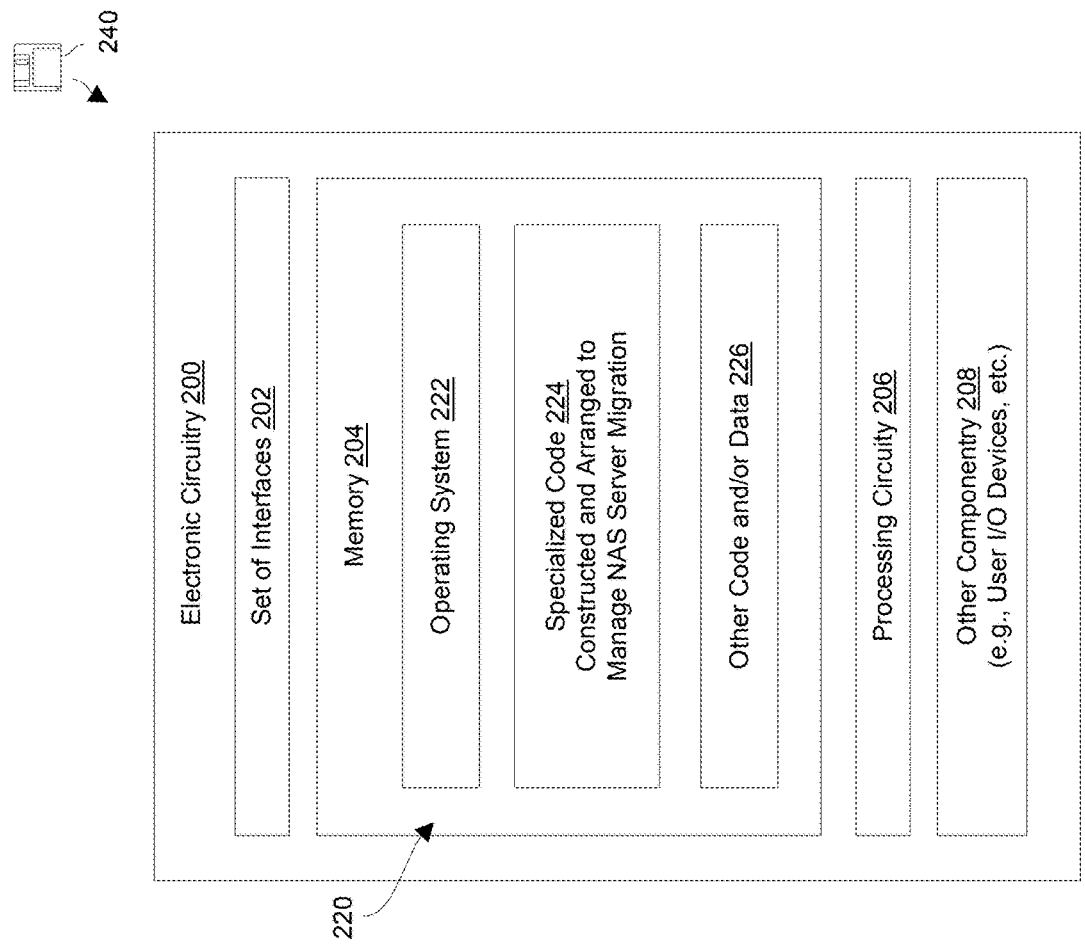
FIG. 2 is a block diagram of electronic circuitry which is suitable for performing a NAS server migration process in accordance with certain embodiments.

FIG. 2 shows electronic circuitry 200 which is suitable for managing NAS server migration in accordance with certain embodiments. It should be understood that the electronic circuitry 200 may reside within one or more of the storage arrays 104 and/or in circuitry external to the storage arrays 104 (e.g., within a client device 102, within one of the other devices 108, etc.). As shown in FIG. 2, the electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 108 (FIG. 1) to enable communications with other devices of the environment 100. Such communications may be IP-based, SAN-based, cellular-based, cable-based, fiber-optic based, wireless, cloud-based, combinations thereof, and so on. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions and/or other software constructs for, among other things, migrating a NAS server 120 from a source array 104(S) to a destination array 104(D). The other code and/or data 226 refers to other constructs for various applications and tools, databases, settings, thresholds, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably manages NAS server migration. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a user interface, power supplies, fans, specialized equipment, etc. Further details will now be provided with reference to FIGS. 3 through 10.

Figure 3:
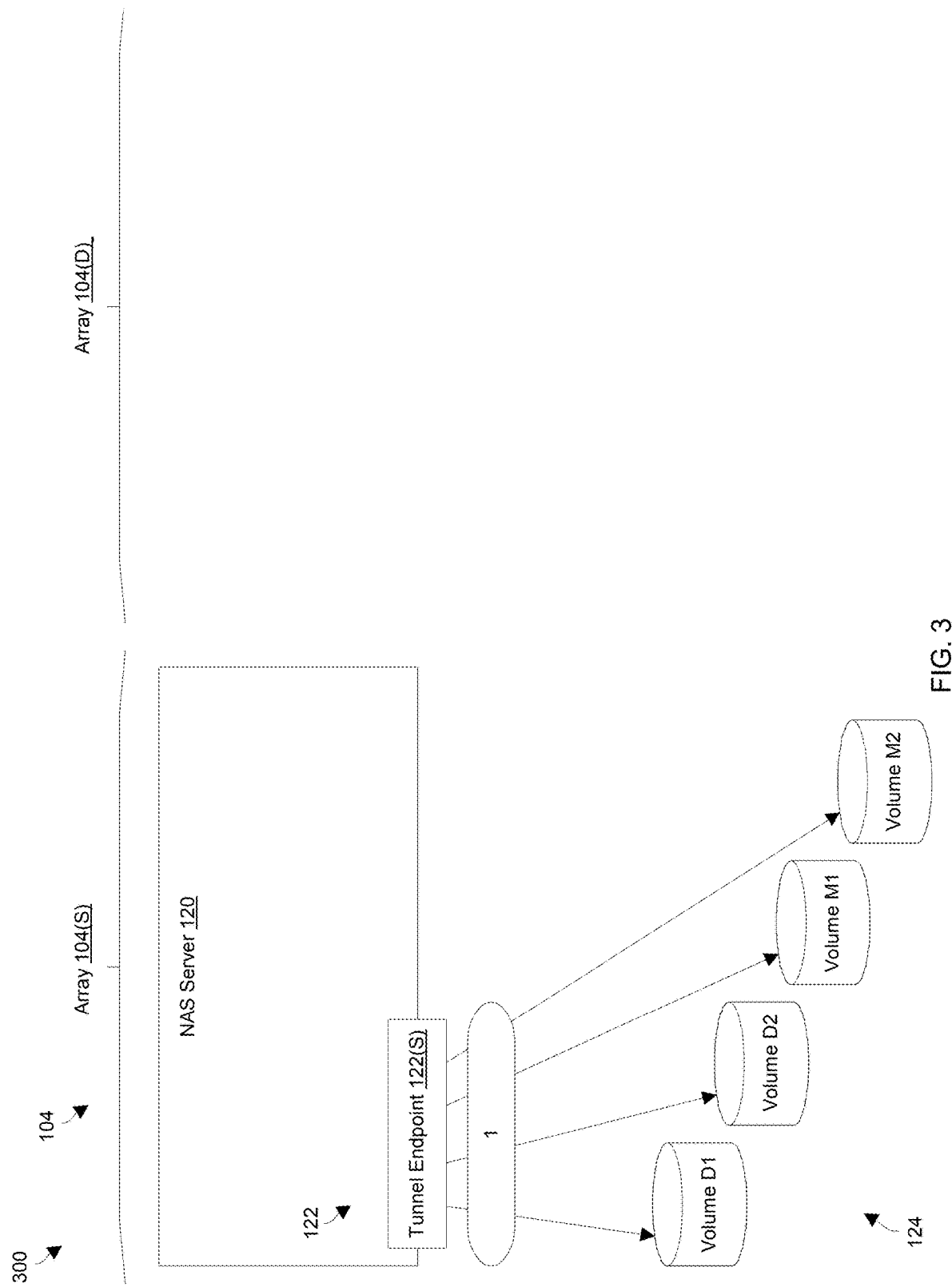
FIG. 3 is a block diagram illustrating particular NAS server migration process details at a first time in accordance with certain embodiments.
Figure 4:
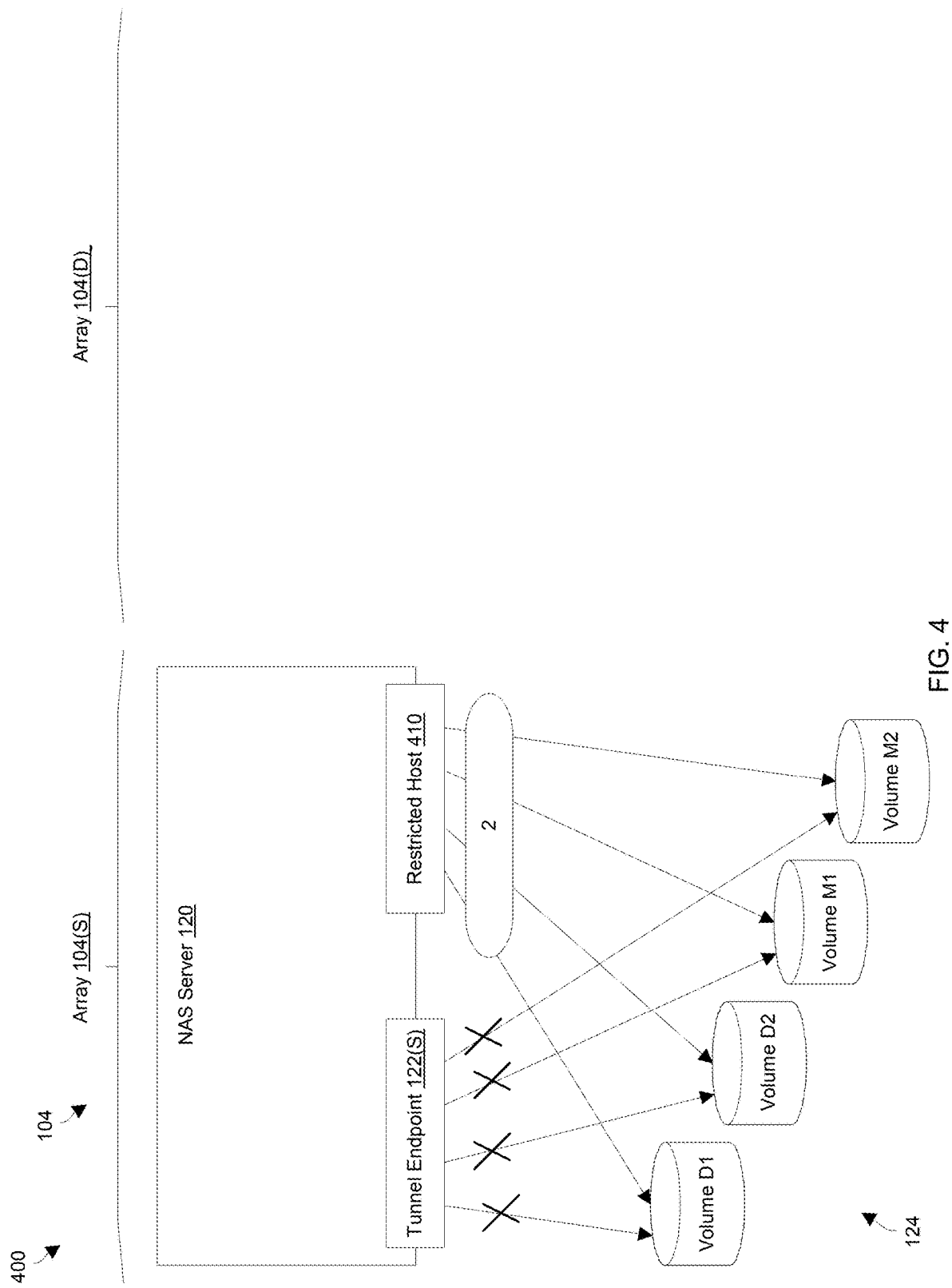
FIG. 4 is a block diagram illustrating particular NAS server migration process details at a second time in accordance with certain embodiments.
Figure 5:
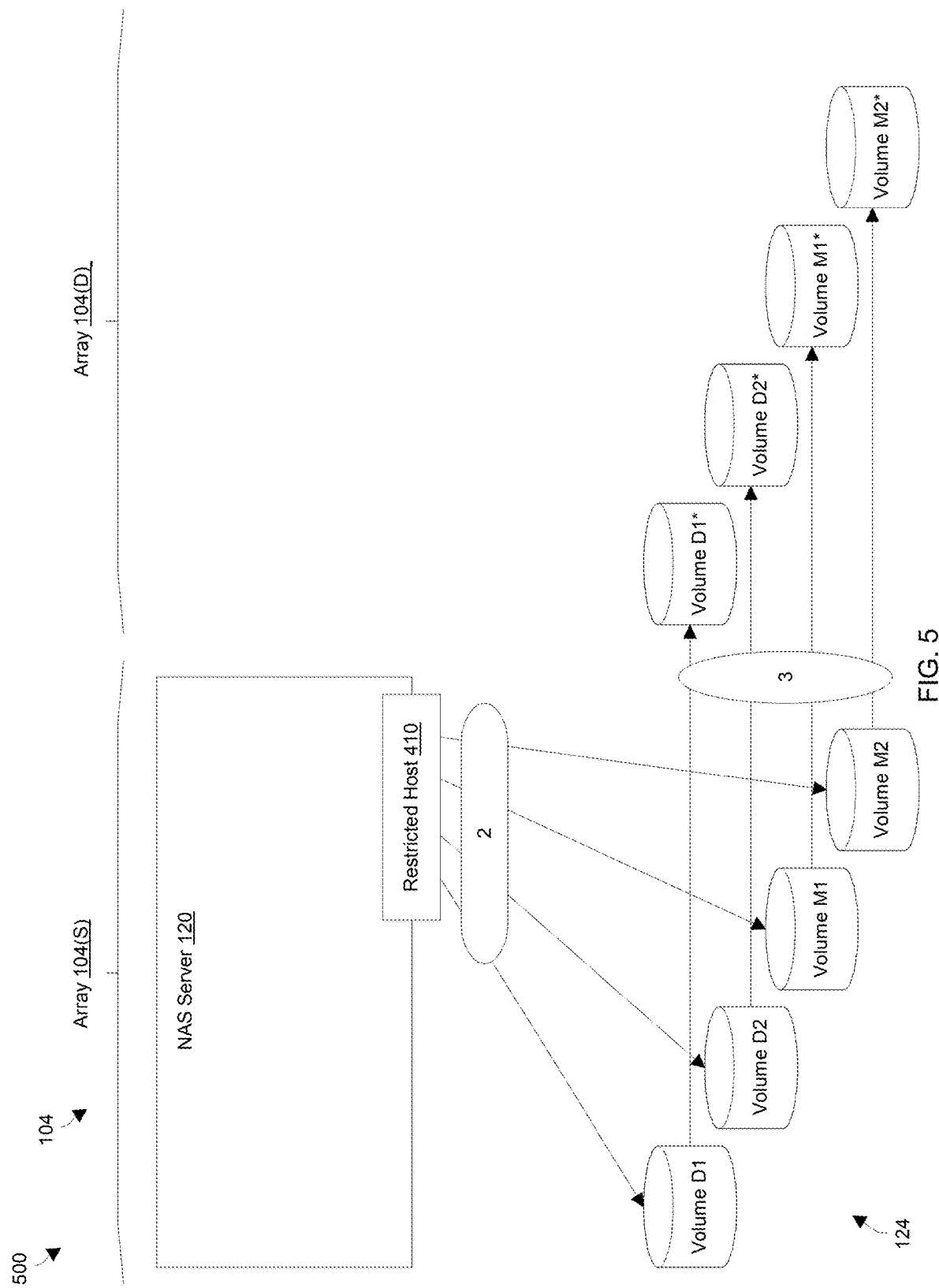
FIG. 5 is a block diagram illustrating particular NAS server migration process details at a third time in accordance with certain embodiments.
Figure 6:
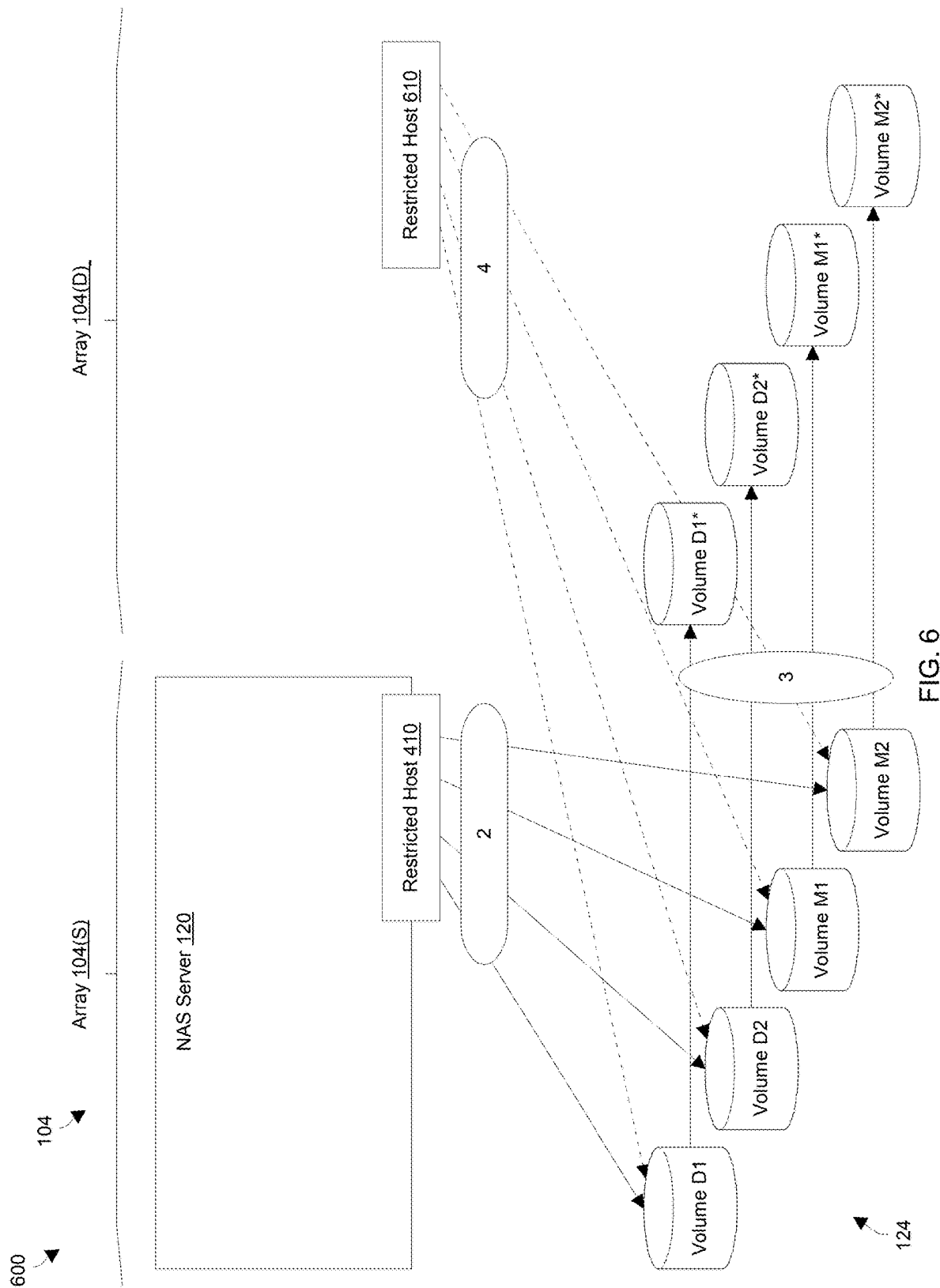
FIG. 6 is a block diagram illustrating particular NAS server migration process details at a fourth time in accordance with certain embodiments.
Figure 7:
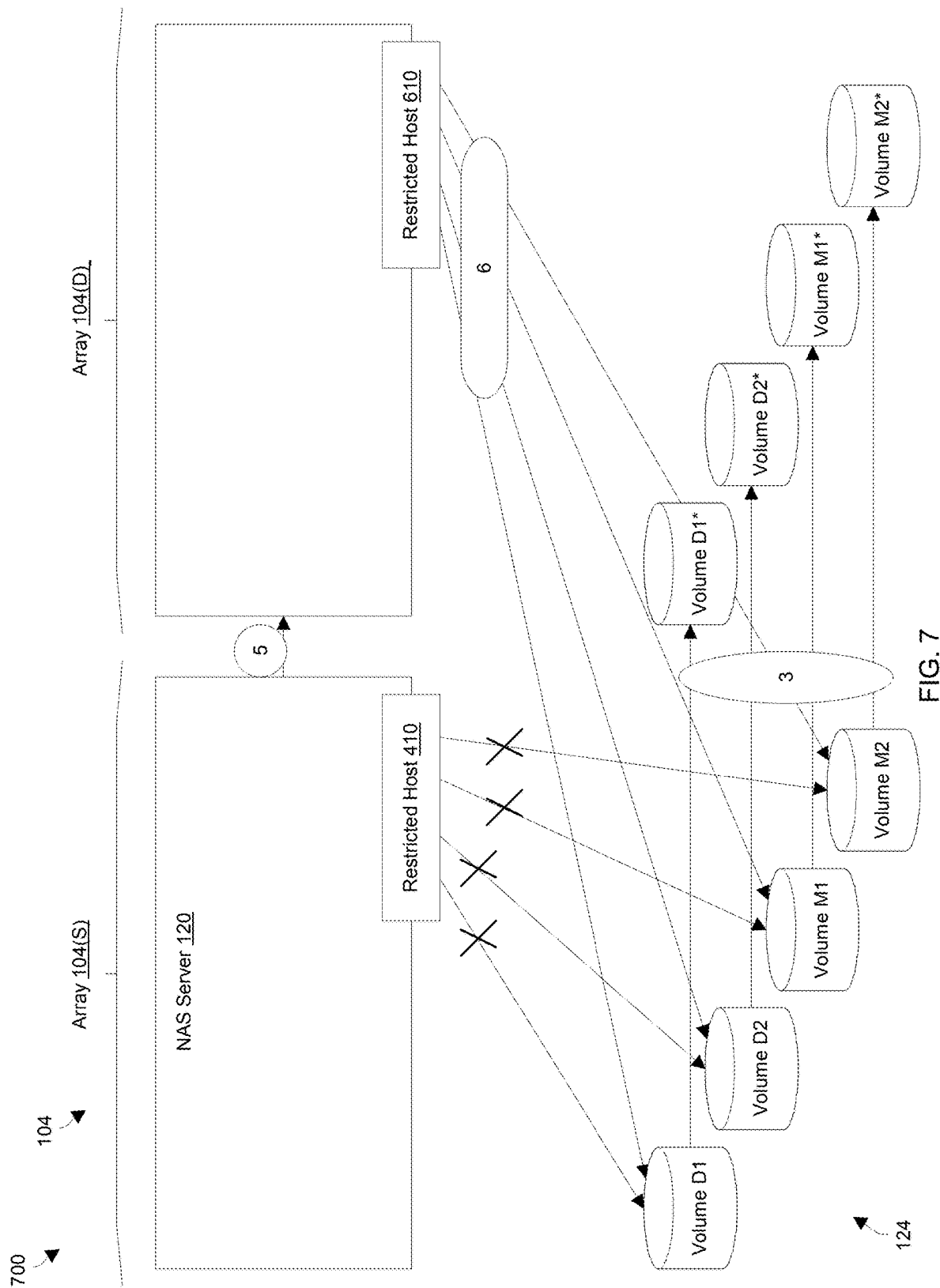
FIG. 7 is a block diagram illustrating particular NAS server migration process details at a fifth time in accordance with certain embodiments.
Figure 8:
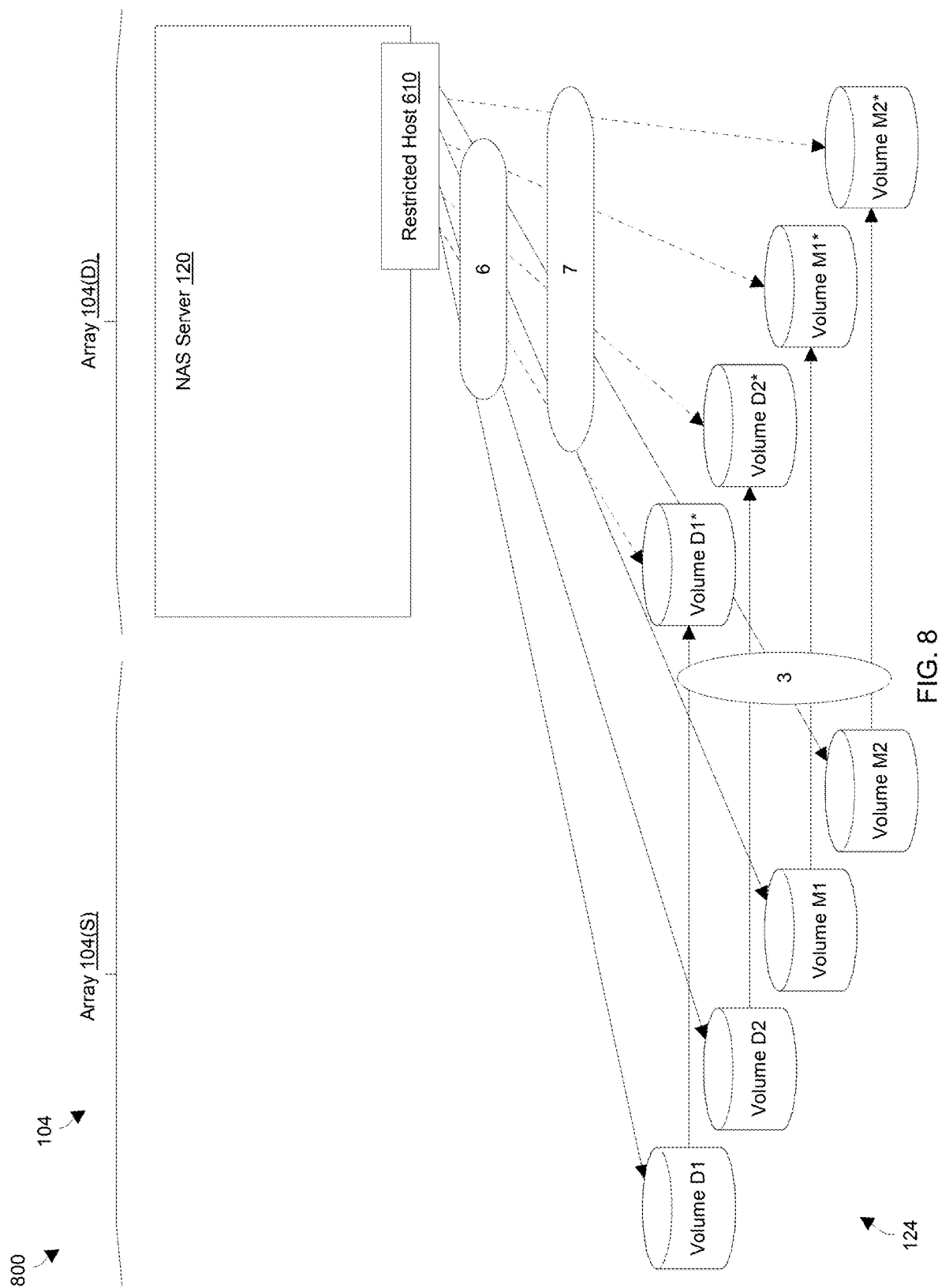
FIG. 8 is a block diagram illustrating particular NAS server migration process details at a sixth time in accordance with certain embodiments.
Figure 9:
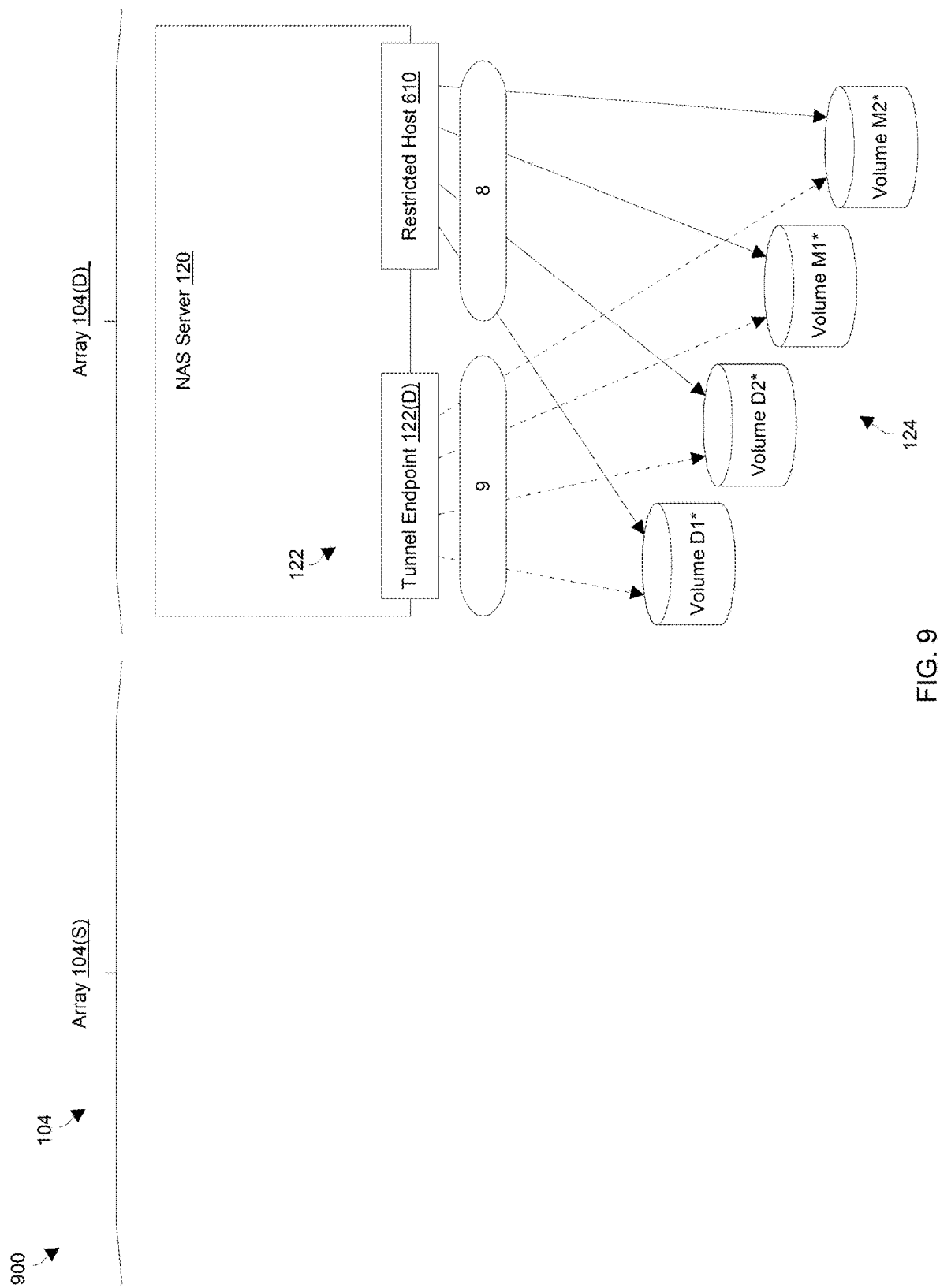
FIG. 9 is a block diagram illustrating particular NAS server migration process details at a seventh time in accordance with certain embodiments.
Figure 10:
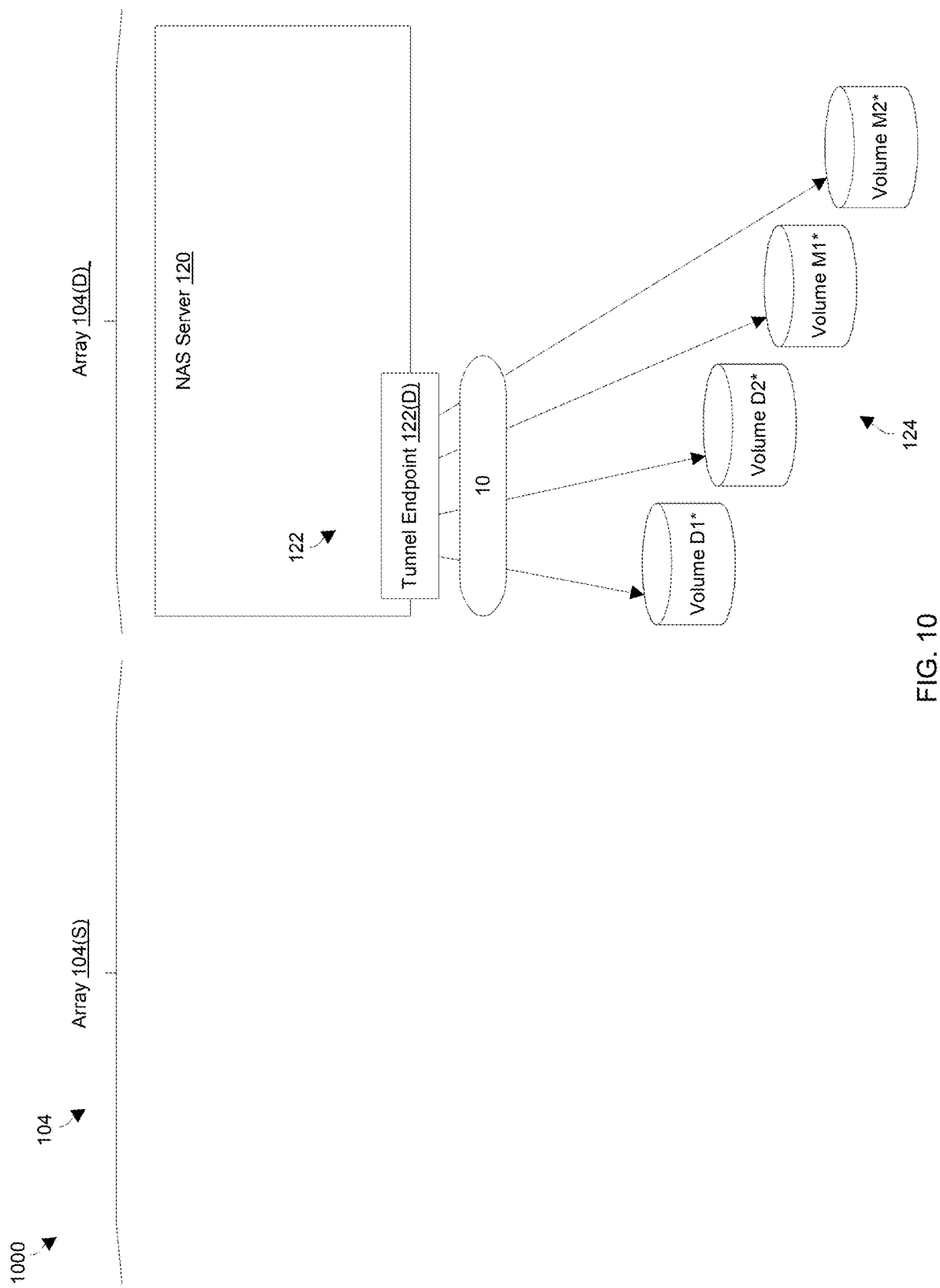
FIG. 10 is a block diagram illustrating particular NAS server migration process details at an eighth time in accordance with certain embodiments.

FIGS. 3 through 10 show various details for a process in which a NAS server 120 migrates from a source array 104(S) to a destination array 104(D) in accordance with certain embodiments. FIG. 3 shows a view 300 of certain details at a first time. FIG. 4 shows a view 400 of certain details at a second time. FIG. 5 shows a view 500 of certain details at a third time. FIG. 6 shows a view 600 of certain details at a subsequent time. FIG. 7 shows a view 700 of certain details at a subsequent time. FIG. 8 shows a view 800 of certain details at a subsequent time. FIG. 9 shows a view 900 of certain details at a subsequent time. FIG. 10 shows a view 1000 of certain details at a subsequent time.

It should be understood that the NAS server migration process may be controlled by specialized circuitry (e.g., see FIG. 2). In some embodiments, the specialized circuitry carries out the migration process in an automated manner. In other embodiments, the specialized circuitry provides commands and receives updates along various steps of the way to enable the process to be overseen, orchestrated, controlled, and/or monitored, etc. by a human operator.

Initially, as shown in the view 300 of FIG. 3, a NAS server 120 is a compute instance which operates on a source array 104(S). Along these lines, the NAS server 120 is able to access volumes 124 through a tunnel endpoint 122 on the source array 104(S), namely, volumes D1, D2, M1, and M2 through a tunnel endpoint 122(S). Such an initial configuration may have been setup by the specialized circuitry at some earlier time.

It should be appreciated that the operating systems running on the arrays 104 (e.g., Linux) may impose a limit on the number of volumes 124 that can be directly mounted as devices (constructs/resources that are supported and managed by the operating systems). Accordingly, in a situation in which the volumes 124 are directly mounted as the devices, there would be a limitation to the number of volumes 124 that are directly mounted as the devices at any one time.

To avoid this limitation, the arrays 104 may use tunnel endpoints 122 to enable the arrays 104 to access a larger number of volumes 124 at any one time (e.g., many tunnel endpoints 122 providing access to many volumes 124). As mentioned earlier, tunnel endpoints 122 are layers of abstraction that enable volumes 124 (which may be referred to as tunnel volumes while accessible via a tunnel endpoint 122) to be locally visible as devices to the operating systems.

It should be understood that the NAS server 120 is described as currently being configured to access two volumes 124 containing regular data (i.e., volumes D1 and D2) and two volumes 124 containing metadata (i.e., volumes M1 and M2) by way of example only. Regular data refers to normal data (e.g., data which is used by applications). On the other hand, metadata refers to special data which the arrays 104 use for supporting operation (e.g., operating system data, mappings, deduplication data, other configuration data, data for recovery/reconstruction, combinations thereof, and so on). It should be understood that the NAS server 120 may access any number of volumes 124 containing regular data and metadata (e.g., fewer than four volumes, five volumes, six volumes, and so on).

At 1 in the view 300 of FIG. 3, the NAS server 120 accesses the volumes D1, D2, M1, and M2 via the tunnel endpoint 122(S) on the source array 104(S). Along these lines, the NAS server 120 may respond to I/O requests 110 (e.g., read commands and/or write commands) from one or more NAS clients (e.g., also see the client devices 102 in FIG. 1).

At 2 in the view 400 of FIG. 4, to begin the migration process, the specialized circuitry converts (or preconverts) tunnel volumes on a source array 104(S) into normal volumes (e.g., volumes that are directly mounted as devices of the source array 104(S)). Along these lines, the specialized circuitry creates and operates a restricted host 410 (e.g., a SCSI initiator that is transparent to NAS clients) on the source array 104(S) to provide access to the volumes 124 of the NAS server 120. That is, volumes D1, D2, M1, and M2 are now directly mounted as operating system devices and the NAS server 120 then performs I/O operations (IOs) to volumes D1, D2, M1, and M2 via the restricted host 410. At this time, the specialized circuitry also disables (terminates) access to volumes D1, D2, M1, and M2 via tunnel endpoint 122(S) (as illustrated by the Xs). As referred to earlier, the specialized circuitry may effectuate the above-described process details by providing various instructions to the source array 104(S) and receiving various confirmation responses from the source array 104(S).

It should be appreciated that such conversion (or preconversion) of the volumes 124 from tunnel volumes to normal volumes does not unduly burden or restrict the source array 104(S) by exceeding the limitation on the number of directly mounted devices. Rather, NAS server migration may occur incrementally (e.g., one-by-one) and the number of volumes 124 that are accessed by just a single NAS server 120 is relatively low (e.g., less than 200).

At 3 in the view 500 of FIG. 5, the specialized circuitry establishes mirroring relationships to mirror the volumes 124 that are accessed by the NAS server 120 on the source array 104(S) to corresponding volumes 124 on the destination array 104(D). That is, the specialized circuitry creates the corresponding volumes 124 and establishes mirroring sessions in which the arrays 104 cooperate to copy data from the volumes D1, D2, M1, and M2 on the source array 104(S) to the volumes D1*, D2*, M1*, and M2* on the destination array 104(D). Such mirroring may take some time before all of the data is copied to the corresponding volumes 124 on the destination array 104(D) (e.g., hours).

At 4 in the view 600 of FIG. 6, the specialized circuitry creates a restricted host 610 on the destination array 104(D) and connects the restricted hose 610 to the volumes D1, D2, M1, and M2 on the source array 104(S). Here, SCSI path access for the restricted host 610 is inactive (as illustrated by the dashed arrows) and, during this time, the NAS Server 120 on the source array 104(S) continues to provide IO access to the volumes D1, D2, M1, and M2 on source array 104(S) (activity 2). Additionally, the copying of data from the volumes D1, D2, M1, and M2 to the volumes D1*, D2*, M1*, and M2* continues if necessary (activity 3).

At 5 in the view 700 of FIG. 7, the NAS server 120 moves from the source array 104(S) to the destination array 104(D). Along these lines, the specialized circuitry copies configuration information for the NAS server 120 from the source array 104(S) to the destination array 104(D). The specialized circuitry then runs a compute instance on the destination array 104(D) using the copied configuration information to form the NAS server 120 on the destination array 104(D).

At this point, at 6 in the view 700 of FIG. 7, the NAS server 120 operates on the destination array 104(D) and accesses the volumes D1, D2, M1, and M2 on the source array 104(S) via SCSI paths, iSCSI, etc. (created in activity 4 above, also see FIG. 6). At this time, the specialized circuitry disables (terminates) access to volumes D1, D2, M1, and M2 via the restricted host 410 (as illustrated by the Xs). Additionally, due to the previously established mirroring relationships, copying of data from the volumes D1, D2, M1, and M2 to the volumes D1*, D2*, M1*, and M2* continues if necessary (activity 3).

It should be appreciated that stopping the NAS server 120 on the source array 104(S) and starting the NAS server 120 on the destination array 104(D) takes a relatively short amount of time (e.g., a few seconds). Along these lines, the metadata volumes M1* and M2* on the destination array 104(D) are already available for access and the NAS server 120 is already provisioned/configured with appropriate identity, address and credential information thus enabling the NAS clients to quickly communicate with the NAS server 120 on the destination array 104(D).

Moreover, the I/O requests 110 from the NAS clients (also see FIG. 1) may utilize protocols such as NFS/SMB which have internal retry mechanisms if the NAS server endpoint is not available. Since the NAS server 120 becomes available immediately on the destination array 104(D) with the same set of IP addresses as those used when the NAS server resided on the source array 104(S), the retry mechanisms within these protocols ensures that the NAS clients do not receive any IO errors.

As mentioned above, at 6 in the view 700 of FIG. 7, although the NAS server 120 has moved from the source array 104(S) to the destination array 104(D), the NAS server 120 is still performing IOs using the volumes D1, D2, M1, and M2 on the source array 104(S). Next, at 7 in the view 800 of FIG. 8, the specialized circuitry connects the restricted host 610 to the volumes D1*, D2*, M1*, and M2* on the destination array 104(D) but the paths from restricted host 610 to the volumes D1*, D2*, M1*, and M2* are inactive (not yet used for IOs as illustrated by the dashed arrows) while data is still being copied from the volumes D1, D2, M1, and M2 to volumes D1*, D2*, M1*, and M2* (activity 3).

At 8 in the view 900 of FIG. 9, once all of the data has been copied from the volumes D1, D2, M1, and M2 on the source array 104(S) to the volumes D1*, D2*, M1*, and M2* on the destination array 104(D), the specialized circuitry switches the restricted host 610 to use the paths to the volumes D1*, D2*, M1*, and M2*. Accordingly, the paths from the restricted host 610 to the volumes D1, D2, M1, and M2 on the source array 104(S) become inactive, and the paths from the restricted host 610 to the volumes D1*, D2*, M1*, and M2* on the destination array 104(D) become active. This switch is very fast and transparent to NAS clients (there is minimal to no disruption to IO traffic). At this point, the NAS server 120 is essentially fully migrated from the source array 104(S) to the destination array 104(D) (e.g., all the metadata volumes that support the NAS server 120 and all of the regular data volumes that the NAS server 120 provides access to now reside on the destination array 104(D)). Accordingly, the resources of the source array 104(S) may be repurposed, etc. However, the paths utilized by the NAS server 120 involve accessing the volumes D1*, D2*, M1*, and M2* on the destination array 104(D) via direct mounting as devices of the destination array 104(D).

At 9 in the view 900 of FIG. 9, the specialized circuitry creates a tunnel endpoint 122(D) on the source array 104(S), and paths/mappings are established while the NAS server 120 continues to provide access to the volumes D1*, D2*, M1*, and M2* on the destination array 104(D) via direct mounting as devices. The paths/mappings from the tunnel endpoint 122(D) to the volumes D1*, D2*, M1*, and M2* are initially inactive (as illustrated by the dashed arrows).

At 10 in the view 1000 of FIG. 1000, after the paths, etc. for the tunnel endpoint 122(D) have been established, the specialized circuitry directs the NAS server 120 to perform IOs to the volumes D1*, D2*, M1*, and M2* via the tunnel endpoint 122(D) in place of using the restricted host 610. Again, this switch is very fast and transparent to the NAS clients (there is minimal to no disruption to IO traffic). The specialized circuitry may orchestrate this switch to occur all at once (the NAS Server 120 stops using restricted host 610 completely and instead uses the tunnel endpoint 122(D)) or incrementally (the NAS server 120 switches from using restricted host 610 to using tunnel endpoint 122(D) for each volume 124 one at a time, etc.).

It should be appreciated that the specialized circuitry may repeat the NAS server migration process if another NAS server 120 is to be moved from the source array 104(S) to the destination array 104(D). In some situations, it may be possible to move multiple NAS servers 120 in parallel from the source array 104(S) to the destination array 104(D) as long as consumption of array resources is not excessive (e.g., the number of volumes mounted as devices does not exceed limitations). Further details will now be provided with reference to FIG. 11.

Figure 11:
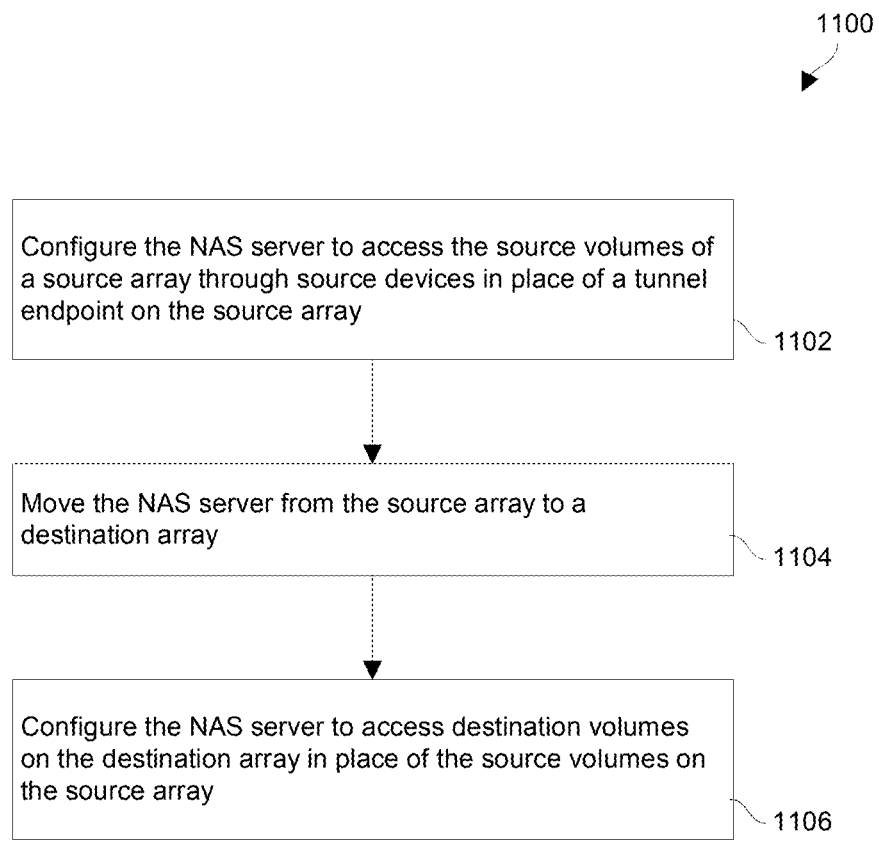
FIG. 11 is a flowchart of a NAS server migration procedure which is performed in accordance with certain embodiments.

FIG. 11 is a flowchart of a procedure 1100 of performing NAS server migration. Such a procedure 1100 may be performed by specialized circuitry which may run on a source array, a destination array, and/or external circuitry.

At 1102, after a NAS server has accessed source volumes on a source array through a tunnel endpoint on the source array, the specialized circuitry configures the NAS server to access the source volumes through source devices of the source array in place of the tunnel endpoint on the source array (also see FIG. 4). As mentioned earlier, a tunnel endpoint is a layer of abstraction which offers access to multiple volumes thus serving as an alternative to directly mounting volumes as devices on the source array. At this time, data of the source volumes may be mirrored to the destination volumes on the destination array (also see FIGS. 5 through 8).

At 1104, after the NAS server is configured to access the source volumes through the source devices of the source array, the specialized circuitry moves the NAS server from the source array to a destination array (also see FIG. 7). Such operation involves copying configuration information for the NAS server from the source array to the destination array, stopping a NAS server compute instance on the source array, and starting a NAS server compute instance on the destination array. Additionally, such operation may take place while still providing access to source volumes.

At 1106, after the NAS server is moved from the source array to the destination array, the specialized circuitry configures the NAS server to access corresponding destination volumes on the destination array in place of the source volumes on the source array (also see FIGS. 8 through 10). Along these lines, once mirroring is complete (e.g., all of the data is copied to the destination volumes), the NAS server switches to accessing the destination volumes as normal volumes mounted as devices of the destination array and eventually accesses the destination volumes as tunnel volumes through a tunnel endpoint on the destination array.

Such migration may be performed without interrupting NAS client access to the volumes (e.g., without causing a large time delay). Additionally, such migration may be performed without overburdening the arrays (e.g., the limitations to the number of volumes mounted as devices is not exceeded as NAS server migration may be performed one NAS server at a time.

As described above, improved techniques are directed to performing NAS server migration across storage arrays 104 by preconverting tunnel volumes on a source array 104(S) into normal volumes (e.g., volumes that are directly mounted as devices of the source array). Following such preconversion, the NAS server 120 may be moved from the source array 104(S) to a destination array 104(D), and then quickly acquire access to the normal volumes on the source array 104(S). While the NAS server 120 is on the destination array 104(D) and has access to the normal volumes on the source array 104(S), the normal volumes may be mirrored to corresponding normal volumes on the destination array. The NAS server 120 may then be quickly switched to accessing the corresponding normal volumes on the destination array 104(D) in place of accessing the normal volumes on the source array 104(S). The corresponding normal volumes on the destination array 104(D) may then be converted to tunnel volumes which are locally visible on the destination array 104(D) through a tunnel endpoint on the destination array 104(D) (e.g., via mapping generation). Such converting/mirroring/mapping/etc. may be transparent to NAS clients and not impose any extensive time delays that would otherwise cause DU/DL, other NAS client issues, etc.

One should appreciate that the above-described techniques do not merely move data from one location to another. Rather, the disclosed techniques involve implementing certain efficiencies such as limiting the number of devices consumed in a NAS server migration process, reducing the amount of time that volumes are inaccessible, offering transparency to NAS clients, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 100 such as the client devices 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that current NAS server migration approaches which involve tunnel volumes have limitations with respect to cross appliance NAS volume access. Along these lines, currently the block volumes underlying certain filesystems are tunnel volumes. Such a tunnel volume is an indirection layer introduced to reduce the number of devices attached to the Linux kernel, thereby allowing more filesystems to be created. But this creates a problem for migration of NAS servers (and underlying filesystems) across appliance boundaries.

Since these tunnel volumes cannot be accessed across appliances, there is no way to use the NAS volumes from source appliance once the compute moves to destination, prompting a need to stop the NAS server on source before starting it on the destination. This leads to outages of the NAS server for the clients accessing them. Accordingly, there is a need for a method by which the NAS server can continue catering to clients from source volumes, even when the compute instance is placed on the destination. Such a solution may be to convert the tunnel volumes into direct volumes during the NAS server migration lifecycle.

Software defined NAS (SDNAS) is the compute entity which layers on top of the underlying block storage providing NAS capabilities in certain appliances. The underlying volumes for NAS are tunnel volumes which are accessed through tunnel endpoints. This tunnel endpoint is an indirection layer and is visible as a device to the Linux kernel. Since a single tunnel endpoint can cater to multiple volumes, these NAS volumes are not exposed as devices on the Linux kernel, thereby providing efficient scalability. But the drawback of tunnel volumes is that they are a logical entity and cannot be accessed from other appliances.

This creates problems for the migration of NAS servers from one appliance to another. A conventional sequence of operations while moving a NAS server is outlined below:
1. Create volume migration sessions for each NAS volume which includes a NAS server. This in turn creates shadow volumes on the destination which have the same WWN as the source.
2. Sync the data on to the destination appliance and establish a mirror relation between source volume and destination shadow volume.
3. Attach the destination shadow volumes to the restricted host on destination appliance so that they can be accessed by SNAS compute.
4. Stop the NAS server on source preventing client access.
5. Start NAS server onto the destination appliance. SNAS compute can access the destination volumes since they are attached to the restricted host in step 3 and are having the same wwn as on the source.
6. Since shadow volumes are the primary volumes now, destroy the volumes on the source appliance.

The start of the NAS server in step 5 can take a long time as every volume needs to become accessible on destination and lack of access to even one volume can delay the unavailability of entire NAS server to clients.

In order to solve this issue, below is the change to the sequence of operations in accordance with certain embodiments:
1. When user initiates the migration of a NAS server between appliances, convert the tunnel volumes for this NAS server into direct volumes which have access across appliances.
2. Create the volume migration sessions for the direct volumes and sync the data on to the destination shadow volumes (which are also direct volumes).
3. Establish a mirror relation between source and destination direct volumes. Attach the source volumes to the destination appliance restricted host via SCSI.
4. Move the SDNAS compute to the destination appliance. The data access continues from the source volumes using the SCSI path access available through destination restricted host,
5. Change access for individual volumes to the direct SCST path available to the corresponding destination volumes thereby completely moving the NAS server to destination.

6. Change the direct volumes again into tunnel volumes reinstating the scalability.
7. Destroy the volumes on the source.

Step 4 is a very short window as only the SDNAS compute moved to the destination and the volumes are accessed from source.

Advantageously, this technique achieves the best of both worlds since the scalability of tunnel volumes is retained and the flexibility of direct volumes in NAS server migration reduces the window where the NAS clients lose access to the NAS server.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of performing network attached storage (NAS) server migration, the method comprising:
    after a NAS server has accessed source volumes on a source array through a tunnel endpoint on the source array, configuring the NAS server to access the source volumes through source devices of the source array in place of the tunnel endpoint on the source array;
    after the NAS server is configured to access the source volumes through the source devices of the source array, moving the NAS server from the source array to a destination array; and
    after the NAS server is moved from the source array to the destination array, configuring the NAS server to access destination volumes on the destination array in place of the source volumes on the source array.

2. The method of claim 1, further comprising:
    prior to configuring the NAS server to access the source volumes through source devices of the source array, operating the NAS server on the source array to provide input/output (I/O) access to the source volumes in response to I/O requests from a set of NAS clients.

3. The method of claim 2 wherein operating the NAS server on the source array includes:
    in response to the I/O requests from the set of NAS clients, performing read and write operations on the source volumes through the tunnel endpoint on the source array.

4. The method of claim 1 wherein configuring the NAS server to access the source volumes through the source devices of the source array includes:
    mounting the source volumes on the source array directly as the source devices of the source array.

5. The method of claim 4 wherein configuring the NAS server to access the source volumes through the source devices of the source array further includes:
    after the source volumes on the source array are directly mounted as the source devices of the source array, disabling use of the tunnel endpoint on the source array.

6. The method of claim 1, further comprising:
    prior to moving the NAS server from the source array to the destination array, establishing mirroring relationships between the source volumes on the source array and the destination volumes on the destination array.

7. The method of claim 6 wherein establishing the mirroring relationships includes:
    while the NAS server provides I/O access to the source volumes in response to I/O requests from a set of NAS clients, copying data from the source volumes on the source array to the destination volumes on the destination array.

8. The method of claim 1 wherein moving the NAS server from the source array to the destination array includes:
    copying NAS server configuration information from the source array to the destination array, and
    based on the NAS server configuration information copied from the source array to the destination array, creating a NAS server compute instance on the destination array.

9. The method of claim 8 wherein moving the NAS server from the source array to the destination array further includes:
    terminating operation of a NAS server compute instance on the source array.

10. The method of claim 1, further comprising:
    after the NAS server is moved from the source array to the destination array and prior to configuring the NAS server to access the destination volumes on the destination array, configuring the NAS server to access the source volumes on the source array from the destination array.

11. The method of claim 10 wherein configuring the NAS server to access the source volumes on the source array from the destination array includes:
    while data is being copied from the source volumes on the source array to the destination volumes on the destination array, establishing device paths which enable the NAS server to access the source volumes on the source array through destination devices of the destination array.

12. The method of claim 1 wherein configuring the NAS server to access the destination volumes on the destination array includes:
    configuring the NAS server to access the destination volumes through destination devices of the destination array in place of accessing the source volumes on the source array.

13. The method of claim 12 wherein configuring the NAS server to access the destination volumes on the destination array further includes:
    after the NAS server is configured to access the destination volumes through the destination devices of the destination array, configuring the NAS server to access the destination volumes through a tunnel endpoint of the destination array in place of the destination devices of the destination array.

14. The method of claim 1 wherein the source volumes on the source array include source data volumes and source metadata volumes;
    wherein the destination volumes on the destination array include destination data volumes corresponding to the source data volumes and destination metadata volumes corresponding to the source metadata volumes; and
    wherein the method further comprises:
        after the NAS server is configured to access the destination volumes on the destination array and in response to input/output (I/O) requests from a set of NAS clients, accessing the destination data volumes and the destination metadata volumes.

15. The method of claim 14, further comprising:

after the NAS server is configured to access the destination volumes on the destination array, deleting the source data volumes and the source metadata volumes.

16. Electronic equipment, comprising:
   memory; and
   control circuitry coupled to the memory, the memory storing instructions which, when carried out by the control circuitry, cause the control circuitry to perform a method of:
      after a NAS server has accessed source volumes on a source array through a tunnel endpoint on the source array, configuring the NAS server to access the source volumes through source devices of the source array in place of the tunnel endpoint on the source array,
      after the NAS server is configured to access the source volumes through the source devices of the source array, moving the NAS server from the source array to a destination array, and
      after the NAS server is moved from the source array to the destination array, configuring the NAS server to access destination volumes on the destination array in place of the source volumes on the source array.

17. A computer program product having a non-transitory computer readable medium which stores a set of instructions to perform network attached storage (NAS) server migration; the set of instructions, when carried out by computerized circuitry, causing the computerized circuitry to perform a method of:
   after a NAS server has accessed source volumes on a source array through a tunnel endpoint on the source array, configuring the NAS server to access the source volumes through source devices of the source array in place of the tunnel endpoint on the source array;
   after the NAS server is configured to access the source volumes through the source devices of the source array, moving the NAS server from the source array to a destination array; and
   after the NAS server is moved from the source array to the destination array, configuring the NAS server to access destination volumes on the destination array in place of the source volumes on the source array.

* * * * *